United States Patent [19]

Clark et al.

[11] Patent Number: 5,720,360

[45] Date of Patent: Feb. 24, 1998

[54] LIMITED SLIP DIFFERENTIAL HYDRAULIC DRIVE SYSTEM

[75] Inventors: Brian C. Clark, Owatonna, Minn.; Colin R. Hart, St. Joseph, Mo.

[73] Assignee: Figgie International Inc., Willoughby, Ohio

[21] Appl. No.: 592,790

[22] Filed: Jan. 26, 1996

[51] Int. Cl.$^6$ ................................................. B60K 17/356
[52] U.S. Cl. ................................................ 180/305; 180/197
[58] Field of Search ..................................... 180/197, 248, 180/305, 307, 308

[56] References Cited

U.S. PATENT DOCUMENTS

| | | | |
|---|---|---|---|
| 3,641,765 | 2/1972 | Hancock et al. | 180/308 |
| 4,160,492 | 7/1979 | Johnston | 182/2 |
| 5,201,570 | 4/1993 | Heren et al. | 180/197 |
| 5,368,120 | 11/1994 | Sakai et al. | 180/197 |
| 5,564,519 | 10/1996 | Katoh et al. | 180/197 |
| 5,607,027 | 3/1997 | Puett, Jr. | 180/308 |

FOREIGN PATENT DOCUMENTS

| | | | |
|---|---|---|---|
| 0 562 126 A1 | 9/1993 | European Pat. Off. | 180/305 |
| WO 89/10280 | 11/1989 | WIPO | 180/308 |

*Primary Examiner*—Brian L. Johnson
*Assistant Examiner*—Frank Vanaman
*Attorney, Agent, or Firm*—Senniger, Powers, Leavitt & Roedel

[57] ABSTRACT

An hydraulic drive system for driving a plurality of wheels of a vehicle. The drive system comprises an hydraulic fluid source, at least two motors for driving the vehicle wheels, a pump connected between the fluid source and the motors for drawing hydraulic fluid from the source and forcing the fluid to the motors, at least two flow restrictions, and at least two load-reaction compensators. Each of the motors drives at least one of the wheels at varying speeds in response to varying rates of fluid flow supplied to the motor from the fluid source. Each of the flow restrictions is positioned between the pump and at least one of the motors. Each restriction varies the rate of fluid flow to at least one of the motors in response to changes in fluid pressure upstream from the restriction. Each of the compensators is connected between the pump and at least one of the restrictions. Each compensator controls pressures upstream from at least one of the restrictions to thereby control the speed of the respective wheel. Each compensator maintains a first generally constant fluid pressure upstream from the respective restriction when fluid pressure downstream from the compensator is below a first predetermined value, and maintains a second generally constant fluid pressure upstream from the respective restriction when the downstream fluid pressure is above a second predetermined value.

22 Claims, 6 Drawing Sheets

LIMITED SLIP DIFFERENTIAL HYDRAULIC DRIVE SYSTEM

BACKGROUND OF THE INVENTION

This invention relates generally to an hydraulic drive system for driving wheels of a vehicle such as an aerial work platform, and more particularly the invention relates to a limited slip differential hydraulic drive system.

Aerial work platforms or lifts such as those used to lift personnel to elevated locations include a base, a platform for carrying the personnel and some type of lift mechanism for lifting the platform away from the base. The base is usually mounted on wheels which are selectively powered by a drive system to propel the lift from location to location. Because of their reliability and load capacity, hydraulic systems are frequently used to power both the lift mechanism and drive system.

Although hydraulic drive systems provide reliable and efficient power, their use in lifts has not been without drawbacks. Drive systems usually have a single pump which powers two or four hydraulic motors which drive the vehicle wheels. When one of the powered wheels slips, the fluid resistance of the motor driving the slipping wheel is reduced, causing the system to supply more fluid to that motor. When more fluid is supplied to one motor, less fluid is supplied to the other motor(s). If no correction is made, the slipping wheel will turn faster, using all of the hydraulic fluid, and the other wheels will be starved so that the vehicle will not move.

In order to overcome this problem, a flow divider is frequently used to ensure that hydraulic fluid is evenly supplied to all of the powered wheels. Thus, when a wheel slips, flow to the slipping wheel is limited and hydraulic fluid is directed to the non-slipping wheel(s). As a result, all of the powered wheels are driven at a generally constant speed.

Flow dividers work reasonably well when the vehicle is being driven in a straight line. However, in turns the inside wheels must turn slower than the outside wheels or they will slip, causing loss of traction. In prior art vehicles having drive systems with flow dividers, the wheel speeds are not independently adjusted when the vehicle is turned, causing the inside wheel to slip and lose traction.

SUMMARY OF THE INVENTION

Among the several objects and features of the present invention may be noted the provision of an hydraulic drive system which reduces the speed of inside wheels in a turn to reduce the opportunity for slippage; the provision of such a system which independently limits the speed of the powered wheels to reduce slippage; the provision of such a system which maintains power to non-slipping wheels; the provision of such a system which prevents vehicle runaway by restricting flow from a motor when pressure upstream from the motor is below a predetermined value; the provision of such a system in which mechanical brakes are automatically applied when a sense line pressure is below a predetermined value to prevent vehicle movement when the operator fails to apply a parking brake; the provision of such a system which demands lower continuous horsepower output from an engine thereby more efficiently using the engine and permitting the use of a smaller engine; and the provision of such a system which includes a by-pass line having a valve that opens when pressure downstream from the motor exceeds fluid pressure within a sense line by a predetermined amount to prevent damage to the drive system.

Briefly, apparatus of this invention is an hydraulic drive system for driving a plurality of wheels of a vehicle. The drive system comprises an hydraulic fluid source, at least two motors for driving the vehicle wheels, a pump connected between the fluid source and the motors for drawing hydraulic fluid from the source and forcing the fluid to the motors, at least two flow restrictions and at least two load-reaction compensators. Each of the motors drives at least one of the wheels at varying speeds in response to varying rates of fluid flow supplied to the motor from the fluid source. Each of the flow restrictions is positioned between the pump and at least one of the motors. Each restriction varies the rate of fluid flow to at least one of the motors in response to changes in fluid pressure upstream from the restriction. Each of the compensators is connected between the pump and at least one of the restrictions. Each compensator controls fluid pressure upstream from at least one of the restrictions to thereby control the speed of the respective wheel. Each compensator maintains a first generally constant fluid pressure upstream from the respective restriction when fluid pressure downstream from the compensator is below a first predetermined value, and maintains a second generally constant fluid pressure upstream from the respective restriction when the downstream fluid pressure is above a second predetermined value.

In another aspect of the invention, the hydraulic drive system comprises an hydraulic fluid source, a pump, and at least two sub-circuits supplied with hydraulic fluid drawn from the source by the pump. Each of the sub-circuits comprises a flow restriction, a load-reaction compensator, and at least one motor for driving one of the vehicle wheels.

In yet another aspect of the present invention, the hydraulic drive system drives four wheels of a vehicle. The drive system comprises a fluid source, four motors connected to the fluid source, a pump, at least two flow restrictions, and at least two compensators. Each of the flow restrictions is positioned between the pump and at least one of the motors. The restrictions vary the rate of fluid flow to at least one of the motors in response to changes in fluid pressure upstream from the restriction. Each of the compensators is connected between the fluid source and at least one of the restrictions. The compensators control fluid pressure upstream from at least one of the restrictions to thereby control the speed of the respective wheel.

The various aspects of the present invention are particularly useful in an aerial work platform.

Other objects and features of the invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
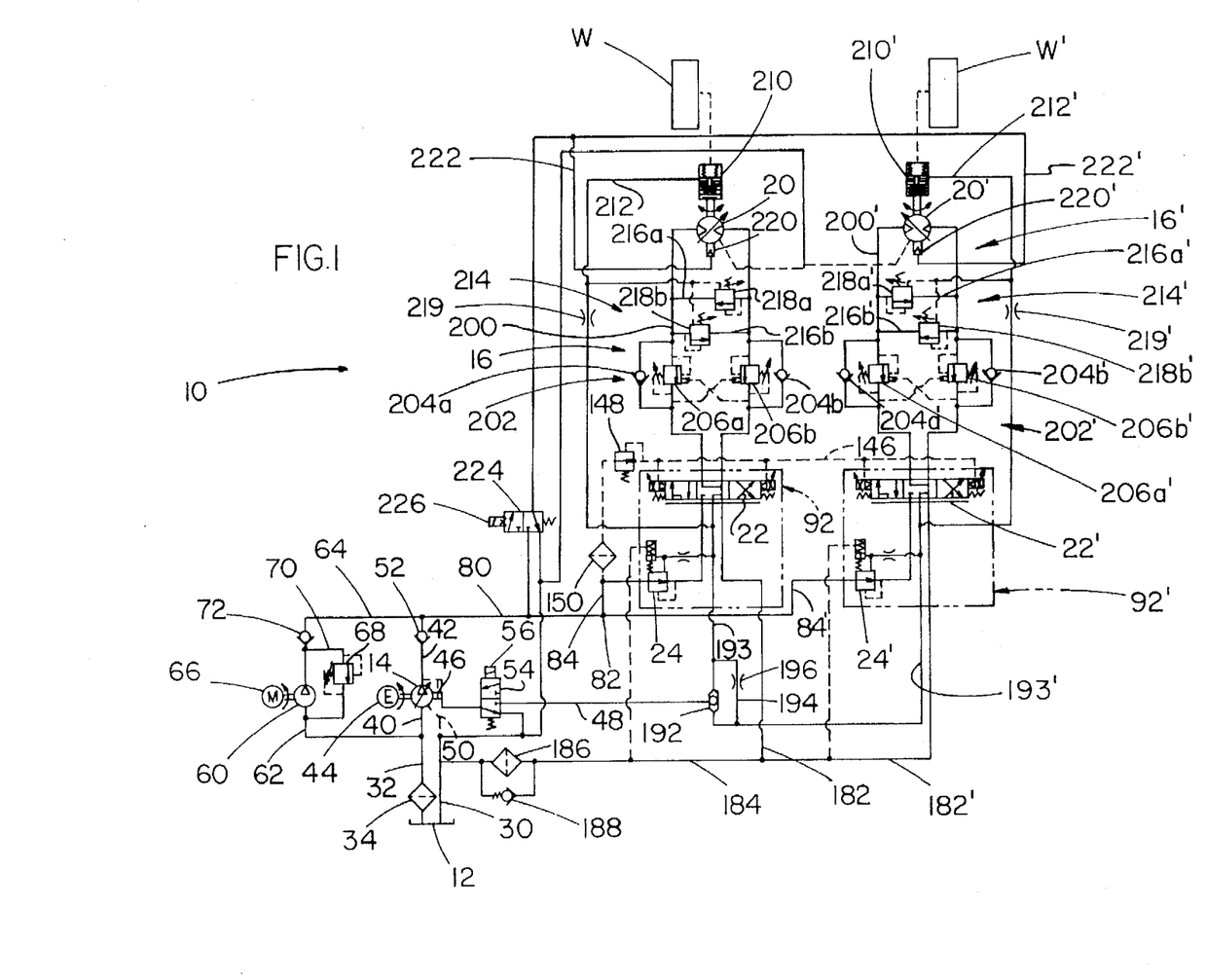
FIG. 1 is a schematic of a two wheel hydraulic drive system of the present invention.
Figure 1A:
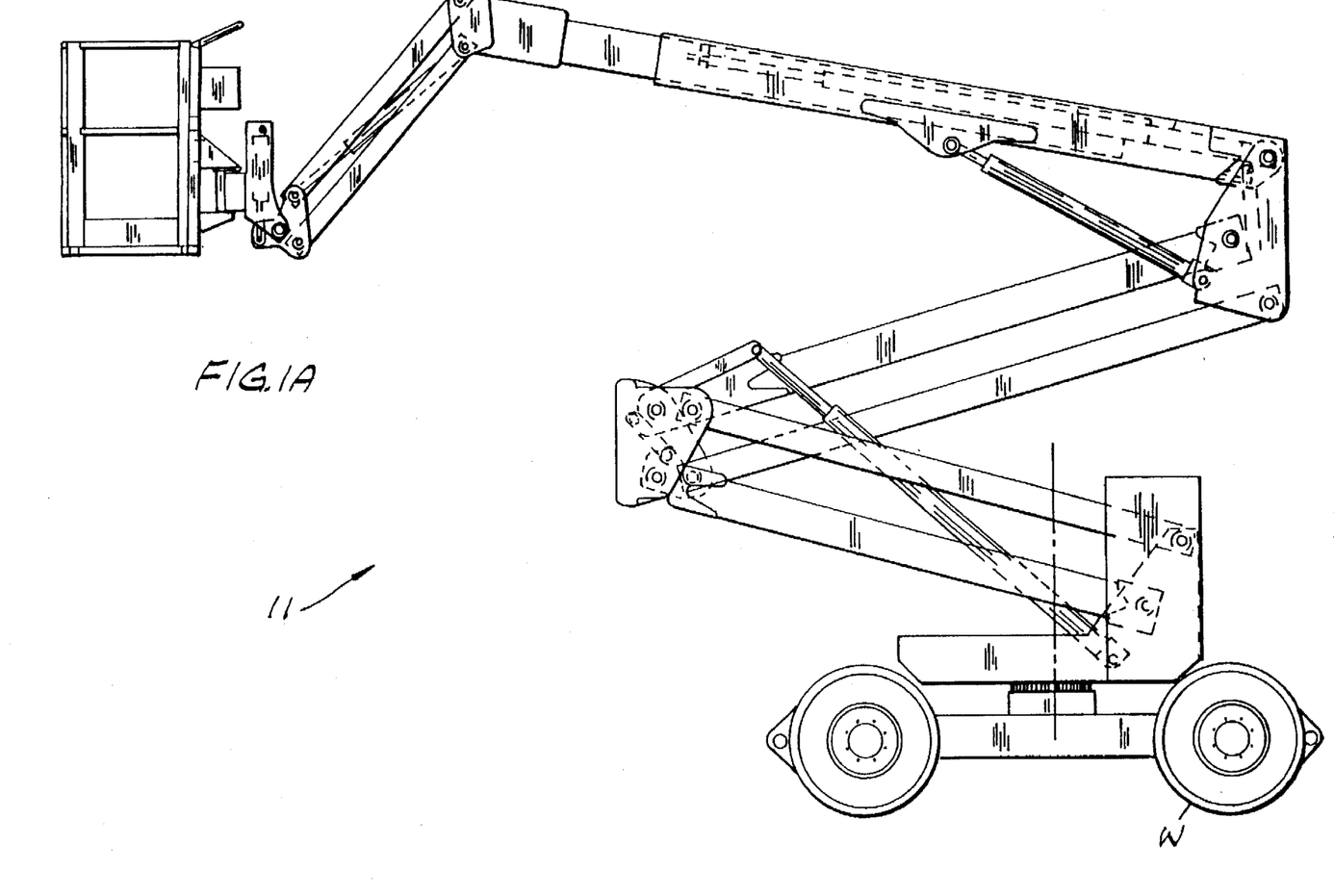
FIG. 1A is a side elevation of an aerial work platform.

Referring now to the drawings and in particular to FIG. 1, an hydraulic drive system indicated generally at 10 is of the type used to propel a vehicle such as an aerial work platform or personnel lift 11 (FIG. 1A).

As schematically illustrated in FIG. 1, the hydraulic drive system 10 of the present invention is comprised of an hydraulic fluid source 12, a primary pump 14, and two identical sub-circuits, generally designated 16, 16'. Each of the sub-circuits 16, 16' includes an hydraulic motor 20, 20' for driving a vehicle wheel W, W', a proportional direction control valve 22, 22' or other flow restriction for varying the fluid flow rate to the respective motor in response to changes in upstream pressure, and a load-reaction compensator 24, 24' for controlling fluid pressure to the respective control valve and thereby controlling the speed of the motor.

The hydraulic fluid source 12 is a tank having an inlet passage 30 for returning fluid to the tank and an outlet passage 32 for drawing fluid from the tank. A strainer 34 is positioned in the outlet passage 32 for filtering hydraulic fluid drawn from the tank.

A pump inlet passage 40 connects the primary pump 14 to the hydraulic fluid source outlet passage 32 so that hydraulic fluid may be drawn from the hydraulic fluid source 12 by the pump 14. The pump 14 communicates with the sub-circuits 16, 16' through a pump outlet passage 42. The pump 14 is preferably a variable speed, load-sense, piston pump driven by a gasoline or diesel engine 44 to force hydraulic fluid drawn from the source 12 through the pump outlet passage 42. A pump control 46 monitors hydraulic fluid pressure downstream from the control valve 22, 22' through a sense line 48 and varies the pump flow rate in response to changes in the sensed pressure. The control 46 maintains the fluid pressure in the outlet passage 42 at 300 pounds per square inch (psi) more than the pressure in the sense line 48 up to a maximum pressure of 3000 psi. (These pressures are illustrative and may vary from system to system.) When the pressure within the sense line 48 is zero, the pump 14 delivers a standby pressure (e.g., 300 psi) which is insufficient to power the system 10. A typical maximum flow rate through the pump 14 is 15 gallons per minute (gpm). A pump drain line 50 returns hydraulic fluid which has leaked through the pump seals to the hydraulic fluid source inlet passage 30. A check valve 52 in the pump outlet passage 42 prevents backflow of hydraulic fluid into the pump 14.

A three-way, two-position control valve 54 is positioned within the sense line 48 for selectively enabling and disabling the drive system 10. The valve 54 is movable between a first position in which fluid drains from the sense line 48, causing the pump 14 to deliver only standby pressure and disabling the system 10, and a second position in which fluid is delivered from the control valves 22, 22' to the pump control 46, causing the pump 14 to pressurize the system 10. The valve is biased toward its first position and has a solenoid actuator 56 which must be energized to move the valve to its stated second position. Thus, the valve 54 acts as a dead-man switch.

An auxiliary pump 60 is also provided in the system 10 to supply hydraulic fluid in the event the primary pump 14 or engine 44 fails. An auxiliary inlet passage 62 connects the auxiliary pump 60 to the hydraulic fluid source outlet 32 and an auxiliary outlet passage 64 delivers fluid from the pump to the sub-circuits 16, 16'. The pump 60 is powered by an electric motor 66. In contrast to the primary pump 14, the auxiliary pump 60 is a fixed-speed gear pump and delivers a constant flow (e.g., 2.0 gpm) of hydraulic fluid when energized. If the pressure increase across the pump 60 exceeds a predetermined value, a relief valve 68 opens to permit fluid to circulate through a by-pass line 70 and relieve the pressure. As with the primary pump 14, the outlet passage 64 of the auxiliary pump 60 includes a check valve 72 to prevent backflow of hydraulic fluid into the pump 60.

The primary and auxiliary pump outlet passages 42, 64 join as a single main hydraulic fluid distribution passage 80 before splitting at a tee 82 into two distribution branches 84, 84' to feed the separate sub-circuits 16, 16'.

Figure 2:
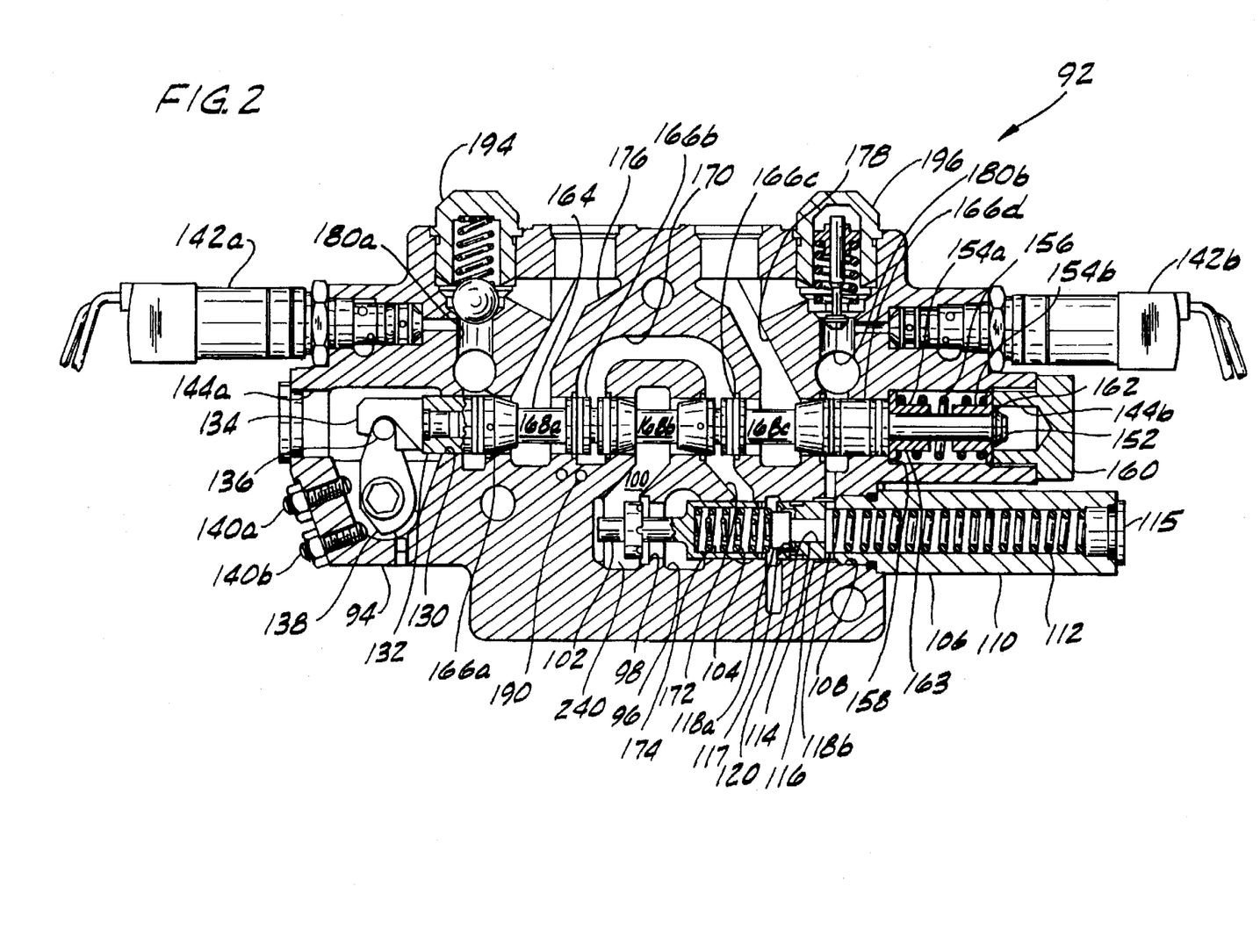
FIG. 2 is a cross section of a combination of a direction control valve and load-reaction compensator of the preferred embodiment.

As illustrated in FIG. 2, the load-reaction compensators 24, 24' of the preferred embodiment are manufactured integrally with proportional direction control valves 22, 22' to form single-piece units (generally designated 92, 92'). The compensator-valve units 92, 92' are identical. For simplicity, only unit 92 is shown in FIG. 2. However, it should be understood that identical features are present in unit 92'.

Figure 3:
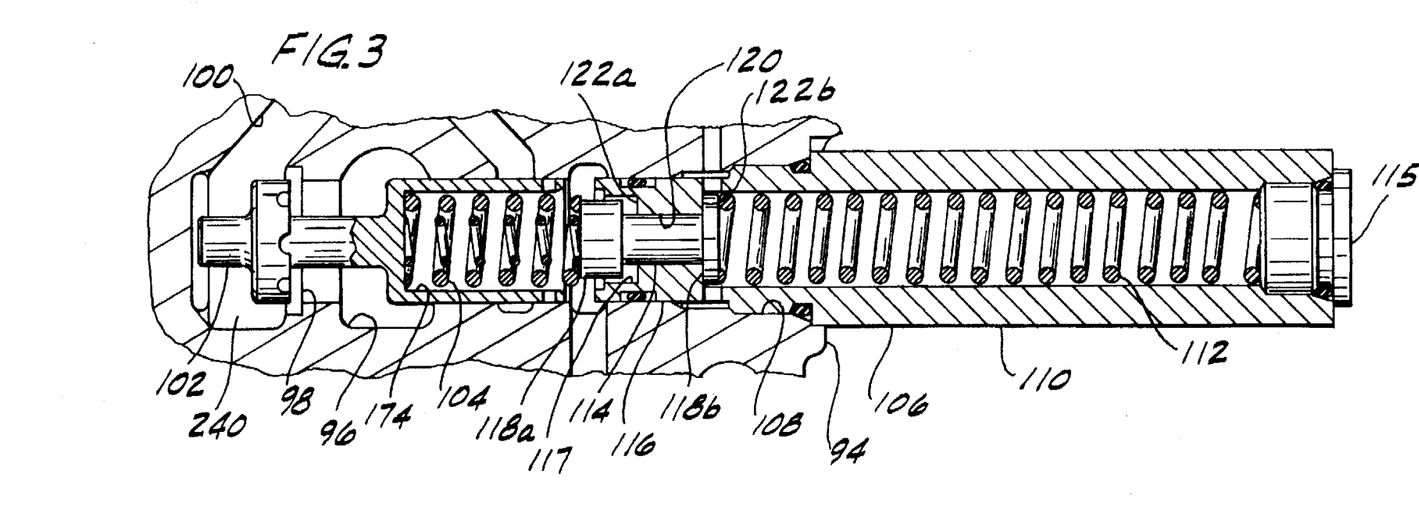
FIG. 3 is a detail of the load-reaction compensator of the preferred embodiment showing a poppet in a high flow position.
Figure 4:
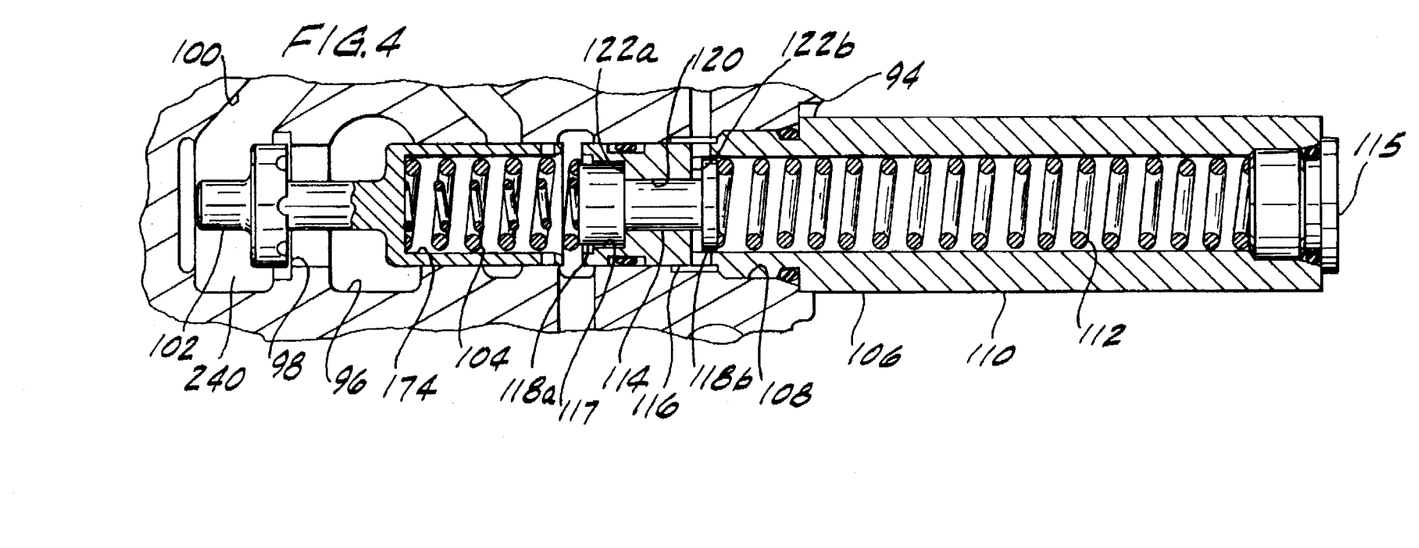
FIG. 4 is a detail of the load-reaction compensator showing the poppet in a low flow position.

The compensator-valve unit 92 has a body 94. Hydraulic fluid enters into a chamber 96 within the body 94 through an intake port (not shown). A valve seat 98 is positioned within the chamber 96 and a first passage 100 extends from one end of the chamber. A poppet 102 is positioned within the chamber and slides relative to the valve seat 98 to vary the flow area between the poppet and valve seat, thereby varying the pressure drop through the compensator 24. The poppet 102 is biased toward its fully open position (to the left as shown) by a spring 104 which is held in position by a spring-loaded insert 106 secured in a bore 108 in the body 94. As best illustrated in FIGS. 3 and 4, the insert 106 includes a cylindrical casing 110 which houses a second spring 112 positioned between a plunger, generally designated 114, at one end of the casing, and an adjustment screw 115 at the other end of the casing 110. The plunger 114 comprises a shaft slidable in a reduced-diameter bore in an end piece 116 of the casing, and a pair of heads 118a, 118b at opposite ends of the shaft, one of the heads (118a) being received in a counterbore 117 in the end piece and the other (118b) being engageable by the spring in the casing. The heads 118a, 118b are spaced apart a distance greater than the length of the bore 120 in the end piece 116, so that the plunger 114 is free to move between a high pressure position (FIG. 3) in which head 118b engages a shoulder 122b at one end of the bore 120, and a low pressure position (FIG. 4) in which the head 118a engages another shoulder 122a at the bottom of the counterbore 117. The second spring 112 biases the plunger 114 toward the high pressure position (to the left as shown). The adjustment screw 115 permits the pre-load in the second spring 112 to be adjusted to change the loading on the plunger 114.

The first passage 100 ends adjacent a bore 130 in the body 94. A spool 132 is slidably received within the bore 130 such that it is selectively moveable between three positions, a forward position (to the right as shown), a neutral position (as shown) and a reverse position (to the left as shown). The spool 132 has a hook 134 formed at one end. A pin 136 on a cam 138 engages the hook 134 so that the cam rotates as the spool 132 moves between the three positions. Set screws 140a, 140b protruding through the body 94 may be adjusted to limit the forward and reverse movement of the spool 132 within the bore 130; however, in the preferred embodiment the set screws 140a, 140b are adjusted so that they do not limit the throw of the spool 132. Rather, electronically controlled reed valves 142a, 142b control the position of the spool 132 by changing the pressures within cavities 144a, 144b at opposite ends of the spool. As illustrated in FIG. 1, a control passage 146 connected to the distribution branch 84 supplies fluid to the reed valves 142a, 142b. Because reed valves are relatively fragile, a pressure reducing valve 148 is positioned along the control passage 146 to prevent over pressurization of the reed valves 142a, 142b. In addition, a filter 150 is positioned along the control passage 146 to prevent debris from entering and damaging the reed valves 142a, 142b.

As further illustrated in FIG. 2, a reduced diameter shaft 152 is formed at the end of the spool 132 opposite the hook 134. Two collars 154a, 154b are slidable on the shaft 152, and a spring 156 biases the collars 154a, 154b to the positions shown wherein one collar 154a is seated against a shoulder 158 in the bore 130 and the other collar 154b is seated against a cap 160 at the end of the bore. The collars 154a, 154b are retained on the shaft 152 by a retaining ring 162 seated within a circumferential groove (not shown) in the shaft. As the spool is actuated toward its reverse position (to the left as shown), the retaining ring 162 causes the collar 154b to move to the left. However, the shoulder 158 prevents the other collar 154a from moving to the left. Instead, the collar 154a slides along the shaft 152, causing the spring 156 to compress. Likewise, when the spool 132 is actuated toward its forward position (to the right as shown), a shoulder 163 on the spool moves the collar 154a the right, but the cap 160 prevents the other collar 154b from moving. Thus, when actuated in either direction, the spring 156 compresses, causing the spool 132 to be biased toward the neutral position shown.

The spool 132 has a main shaft 164 and four lands 166a–d spaced along the shaft. Each land has a tapered end. The lands 166a–d are separated by three shaft sections 168a–c. The sections 168a–c permit flow across the spool 132, and the tapered ends of the lands 166a–d are sized to permit fluid to flow through the direction control valves 22, 22' at a predetermined maximum flow rate (e.g., 7.0 gpm). Further, the sections 168a–c act as flow restrictions to vary the flow rate through the valve 22 in response to fluid pressure changes upstream from the sections caused by the compensator 24. It is important that the sections of both valves 22, 22' be substantially equal in size so that the flow rates through the valves are equal when the flow rates through the compensators 24, 24' are equal.

The first passage 100 communicates with the bore 130 approximately midway along the length of the bore 130. A U-shaped second passage 170 communicates with the bore 130 on opposite sides of the first passage 100. Opposite one end of the second passage 170 is a compensation passage 172 which extends between the bore 130 and a cavity 174 in the poppet 102. Passages (not shown) through the side wall of the poppet 102 permit fluid to enter the cavity 174 from the compensation passage 172. Positioned along the bore 130 to either side of the second passage 170 are third and fourth passages, designated 176 and 178, respectively. Drain passages 180a, 180b are positioned at opposite ends of the spool 132, outboard of the third and fourth passages 176, 178. The drain passages 180a, 180b join to form return passages 182, 182' (FIG. 1) which in turn join to form a main return passage 184 leading to the fluid source inlet passage 30. A filter 186 filters the fluid before it reaches the source inlet passage 30. A spring-biased check valve 188 is positioned in parallel with the filter 186 to permit fluid to by-pass the filter in the event the filter becomes clogged.

The compensator-valve unit described above is sold by Apitech Automotive Systems of Butler, Wis. The Apitech unit includes an anti-cavitation valve and a relief valve, designated 194, 196, respectively, which are not used in the system 10 of the preferred embodiment. Depending upon the position of the spool 132 within the bore 130, the compensator-valve units 92, 92' direct fluid from distribution branches 84, 84' to either the third or the fourth passage 176, 178. The units 92, 92' also direct fluid returning from the motors 20, 20' to the return passages 182, 182'.

A sense line port 190 is positioned at the end of the second passage 170 opposite the compensation passage 172. This port 190 is connected to a shuttle valve 192 (FIG. 1) by sense lines 193, 193'. The shuttle valve 192 only permits the higher of the fluid pressures from the compensator-valve units 92, 92' to pass through the sense line 48 toward the pump control 46. Thus, the pressure controlling the pump 14 is the higher of the two compensator-valve unit sense port 190 pressures, and sufficient system pressure is always ensured.

A balancing passage 194 (FIG. 1) connects the sense lines 48, 48'. The passage 194 includes a restricting orifice 196 which permits fluid to pass through it at a limited and predetermined rate. Thus, small pressure differences between the compensator-valve units 92, 92' may be eliminated when the pressures differ by less than a predetermined amount. However, if the pressure difference exceeds the predetermined amount, the restricting orifice 196 prevents the pressures from equalizing.

As illustrated in FIG. 1, each sub-circuit 16, 16' includes a loop 200, 200' extending from each compensator-valve unit 92, 92' to the respective motor 20, 20' and back to the compensator-valve unit. Each loop 200, 200' includes a runaway-prevention circuit, generally designated 202, 202', which includes check valves 204a, 204b, 204a', 204b'. One of these check valves 204a, 204b, 204a', 204b' is positioned on each side of each motor 20, 20' and is oriented so that it will only permit fluid to flow in a direction from the compensator-valve units 92, 92' to the motor 20, 20'. Counterbalance valves 206a, 206b, 206a', 206b' are mounted in parallel with each of the check valves 204a, 204b, 204a', 204b'. The counterbalance valves 206a, 206b, 206a', 206b' monitor the pressure of the fluid traveling through the loop 200, 200'. When runaway occurs, the motors 20, 20' act as pumps so that fluid pressure downstream from the pump increases and pressure upstream from the pump decreases. Each counterbalance valve 206a, 206b, 206a', 206b' positioned downstream from the motor 20, 20' is normally closed, but it opens when pressure upstream from the motor is above a predetermined value (e.g., 250 psi), or when pressure immediately upstream from the valve falls below a predetermined limit (e.g., 2500 psi). When the valve downstream from the motor 20, 20' is closed, fluid flow through the motor is restricted and the motor is stopped.

Each motor includes a spring-applied, pressure-released brake 210, 210' which is connected by a sense line 212, 212' to the sense port 190, 190'. Each brake 210, 210' begins to be applied when pressure within the respective sense line 212, 212' falls below a predetermined pressure (e.g., 100 psi) and is fully applied when pressure within the line is zero.

If fluid upstream from the motor 20, 20' is pressurized when the mechanical brakes are applied, damage may result to the drive system. Thus, each sub-circuit 16, 16' also includes a by-pass circuit, generally designated 214, 214', for permitting fluid to by-pass the motor 20, 20'. Each by-pass circuit 214, 214' includes two by-pass lines 216a, 216b, 216a', 216b', each of which has a pilot operated relief valve 218a, 218b, 218a', 218b' positioned along its length. The valves 218a, 218b, 218a', 218b' are also connected to the sense lines 212, 212'. When pressure downstream from the motor exceeds pressure in the sense lines by more than a specified amount (e.g., 1000 psi), the appropriate valve 218a, 218b, 218a', 218b' opens, permitting flow through the corresponding by-pass line 216a, 216b, 216a', 216b' to relieve the downstream pressure and avoid damage to the motor 20, 20'. A restricting orifice 219, 219' in the sense line 212, 212' prevents the mechanical brakes from responding too quickly to pressure variations in the sense line.

The motors 20, 20' are axial piston motors having two swashplate angle settings. One setting corresponds to a piston displacement of 2.5 cubic inch per revolution, for example. When in this setting, the motor turns slower, but produces more torque. The other setting corresponds to a piston displacement of 1.2 cubic inch per revolution, for example, so that the motor turns faster but produces less torque. On level ground, where there is no significant load on the drive system 10, the high range (lower displacement) setting may be used. However, when climbing inclines, the low range setting may be used. The high range setting permits travel as fast as 3.5 mile per hour when 7.0 gpm are delivered to each of the motors. The low range permits travel up grades as high as 25 percent. The swashplate angle is controlled by pressure delivered to a motor control 220, 220' through a control line 222. A solenoid actuated, three-way, two-position valve 224 is positioned in the control line 222 for switching the motors 20, 20' between the high and lower ranges. The valve 224 is movable between a first position in which the control line 222 is filled with fluid from the fluid distribution passage 80, causing the swashplate to be angled to deliver low torque and high speed, and a second position in which fluid in the control line 222 is drained to the source inlet passage 30, causing the swashplate to be angled to deliver high torque and low speed. The valve is biased toward its second position and has an actuator 226 which must be energized to move the valve to its stated first position.

To operate the system 10 of the present invention, the operator energizes the engine 44 or motor 66 to power the respective pump 14, 66. The pump draws hydraulic fluid from the fluid source 12, and forces it through the fluid distribution passage 80 to the compensator-valve units 92, 92'. The primary pump 14 senses the pressure of fluid in the sense line 48 and generates a hydraulic head equal to a predetermined pressure (e.g., 300 psi) greater than the sense line pressure.

Each compensator-valve unit 92, 92' controls the direction and flow rate of fluid in the respective sub-circuit 16, 16'. Hydraulic fluid enters the body chamber 96 through the intake port (not shown). Because the poppet 102 never entirely seats against the valve seat 98, fluid travels past the seat and into the first passage 100. If the spool 132 is in the forward position (to the right as shown), fluid passes around the main spool shaft section 168b, to both the second passage 170 and the compensation passage 172. Fluid entering the second passage 170 also passes around the spool shaft section 168a and through the third passage 176 to the motor 20. Fluid returning from the motor 20 enters the fourth passage 178, travels around the spool shaft section 168c to the drain passage 180b and ultimately to the return passage 182. In contrast, if the spool 132 is in the reverse position (to the left as shown), fluid passes from the first passage 100, around the spool shaft section 168b, to the second passage 170. Fluid entering the second passage 170 passes around the spool shaft section 168c to both the compensation passage 172 and the fourth passage 178. Fluid entering the fourth passage 178 travels to the motor 20. Fluid returning from the motor 20 enters the third passage 176, travels around the spool shaft section 168a to the drain passage 180a, and ultimately to the return passage 182.

Figure 5:
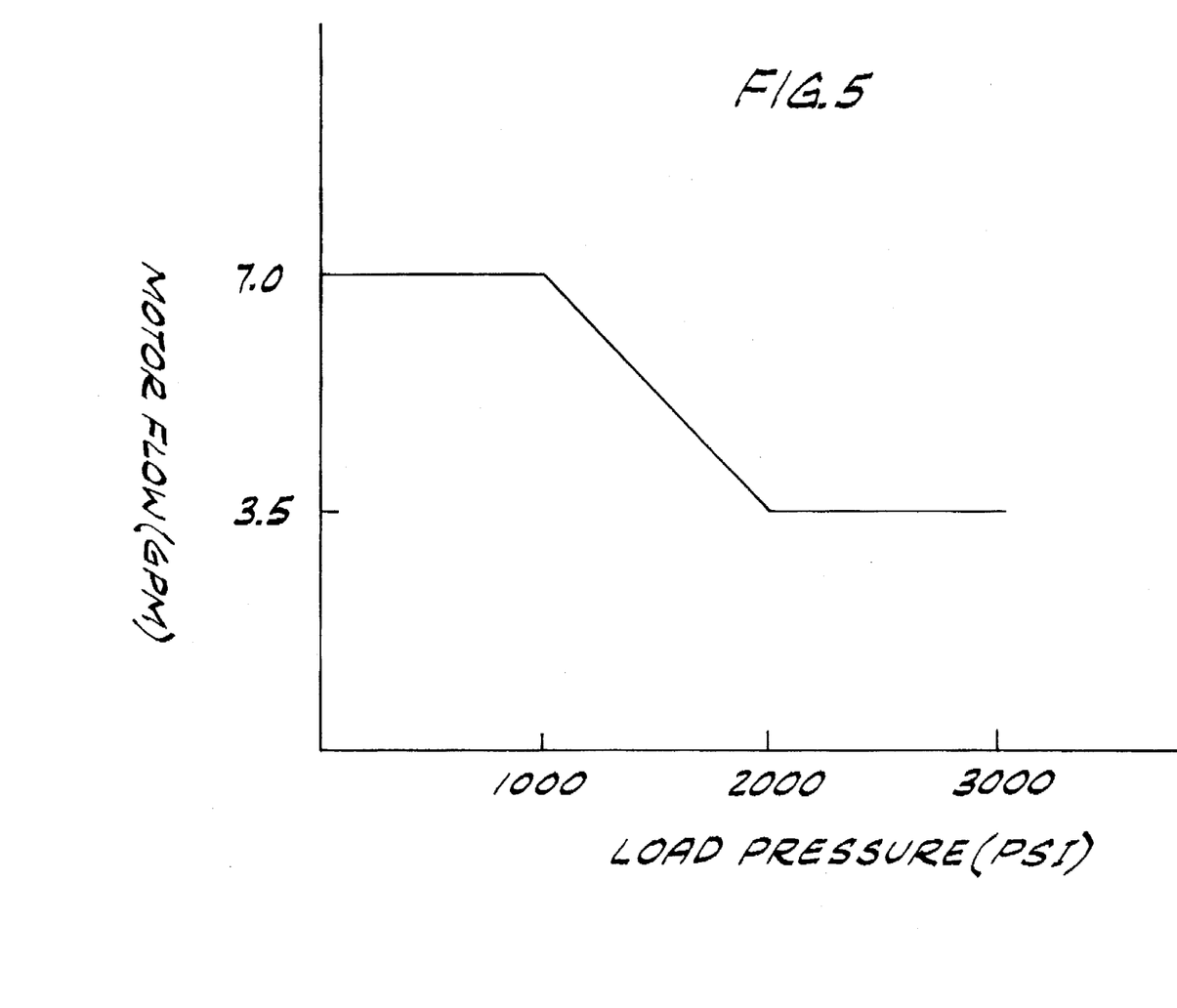
FIG. 5 is a diagram of the flow rate at which hydraulic fluid is delivered to the motor as a function of pressure sensed in a sense line downstream from the compensator.

Regardless of direction of fluid flow through the compensator-valve unit 92, the poppet 102 controls pressure of fluid delivered to the direction control valve 22 so that the flow rate through the valve varies according to a graph similar to that shown in FIG. 5. The compensator passage 172 is in fluid communication with fluid downstream from the compensator 24 when the valve 22 is in the forward or reverse positions. Fluid within the compensator passage 172 enters the poppet cavity 174 and acts against the poppet 102 to bias it toward its fully open position (to the left as shown). The spring 104 also biases the poppet 102 toward a fully open position. However, fluid pressure within the chamber 96 at a location 240 downstream from the valve seat 98 biases the poppet 102 toward a closed position (to the right as shown). Thus, the position of the poppet 102 with respect to the seat 98 is a function of the spring force, as well as, the fluid pressure at location 240 and in the poppet cavity 174. The forces acting on the poppet 102 balance when the force exerted by pressure at location 240 equals the forces exerted by the spring 104 and pressure in the cavity 174. As is well known in the art, the characteristics of the spring 104 may be chosen such that the pressure downstream from the compensator 24 is always proportional to the spring force regardless of flow rate through the compensator.

Because the plunger position within the insert 106 affects the compressed length of spring 104, the force exerted on the poppet 102 by the spring is partially a function of the plunger position. The plunger position is governed by the forces acting on the plunger. The forces which affect the plunger position include the forces exerted by the first and second springs 104, 112 and the force exerted by pressure within the cavity 174. The force exerted by the second spring 112 biases the plunger 114 toward the high pressure position shown in FIG. 3 in which the plunger head 118b engages the shoulder 122b, and the forces exerted by pressure within the cavity 174 and by the first spring 104 bias the plunger 114 toward the low pressure position shown in FIG. 4 in which the plunger head 118a engages the shoulder 122a. The forces acting on the plunger 114 balance when the forces exerted by the cavity pressure and first spring 104 equal the force exerted by the second spring 112. As is well known in the art, the springs 104, 112 may be chosen such that the plunger 114 is positioned in the high pressure position when the cavity pressure is below a first predetermined value (e.g., 1000 psi), such that the plunger moves between the high pressure position and the low pressure position when the cavity pressure is between the first predetermined value and a second predetermined value (e.g., 2000 psi), and such that the plunger is positioned in the low pressure position when the cavity pressure is above the second predetermined value. When the plunger 114 is in the high pressure position (FIG. 3), it produces a relatively high pre-load in the first spring 104 which causes a relatively high constant pressure downstream from the compensator 24 which causes a relatively high constant flow rate (e.g., 7.0 gpm) through the valve 22, and when the plunger is in the low pressure position (FIG. 4), it produces a relatively low pre-load in the first spring which causes a relatively low constant pressure downstream from the compensator which causes a relatively low constant flow rate (e.g., 3.5 gpm) through the valve.

Therefore, when pressure downstream from the compensator 24 is below a first predetermined value (e.g., 1000 psi), the plunger 114 is in the high pressure position (FIG. 3) and the poppet 102 is biased to maintain a first generally constant fluid flow rate (e.g., 7.0 gpm) through the compensator-valve unit 92. When pressure downstream from the compensator 24 is above a second predetermined value (e.g., 2000 psi), the plunger 114 is in the low pressure position (FIG. 4) and the poppet 102 is biased to maintain a second generally constant fluid flow rate (e.g., 3.5 gpm) through the compensator-valve unit 92. When pressure downstream from the compensator 24 is between the first and second predetermined values, the plunger 114 position varies between the high and low pressure positions such that the fluid flow rate through the compensator-valve unit decreases generally linearly from the first generally constant rate to the second generally constant rate as pressure downstream from the compensator rises from the first predetermined value to the second predetermined value.

Although the flow rate is illustrated in FIG. 5 to be 7.0 gpm below 1000 psi and 3.5 gpm above 2000 psi, these rates and pressures may be changed by making various modifications and adjustments to the compensator-valve units 92, 92'. For instance, the pressure at which the plunger 114 begins to move away from the high pressure position may be adjusted by changing the pre-load in the second spring 112. The slope of the middle section of the curve shown in FIG. 5 may be altered by substituting a spring 112 having a different spring constant. The flow rates may be changed by altering the areas throughout the units 92, 92'.

Because the speed at which the wheels turn is directly proportional to the flow rate delivered to the motors, maintaining a constant flow rate produces a constant speed. When the vehicle is steered in a straight line on level ground, the pressures downstream from the compensator-valve units 92, 92' are steady and below 1000 psi. Thus, the flow rate delivered to the motors is steady at 7.0 gpm. If a wheel begins to slip, the compensator-valve units 92, 92' limit the flow rate to 7.0 gpm so that the slipping motor does not turn faster, and the non-slipping motor is not starved. Therefore, the non-slipping wheels will not lose power and will continue to turn.

When the vehicle is driven up a steep incline, the system pressures increase. When pressure downstream from a compensator 24, 24' exceeds 1000 psi, the flow rate and speed decrease as shown in FIG. 5. For a constant horsepower motor, the torque provided is inversely proportional to the flow rate delivered to the motor. Thus, when the flow rate to the motor is low, the motor generates greater torque to aid the vehicle in climbing an incline. If even more torque is required, the operator may shift valve 224 to the low range setting as explained above.

When the vehicle makes a turn, the inside wheels rotate at a slower speed than the outside wheels. This causes the pressure in the sub-circuit 16, 16' of the motorized inside wheel to increase. When the pressure in the sub-circuit corresponding to this inside wheel exceeds 1000 psi, the flow rate of the fluid delivered to the inside wheel is decreased until the load on the wheel is relieved. Thus, the speed of the inside wheel is reduced so that it will not slip. When the vehicle is simultaneously making a turn and driving up an incline, the low range setting may be used to deliver the required power for climbing the incline. Thus, the inside wheel can still be slowed by the compensator so that it does not slip as the vehicle ascends the incline.

Figure 6:
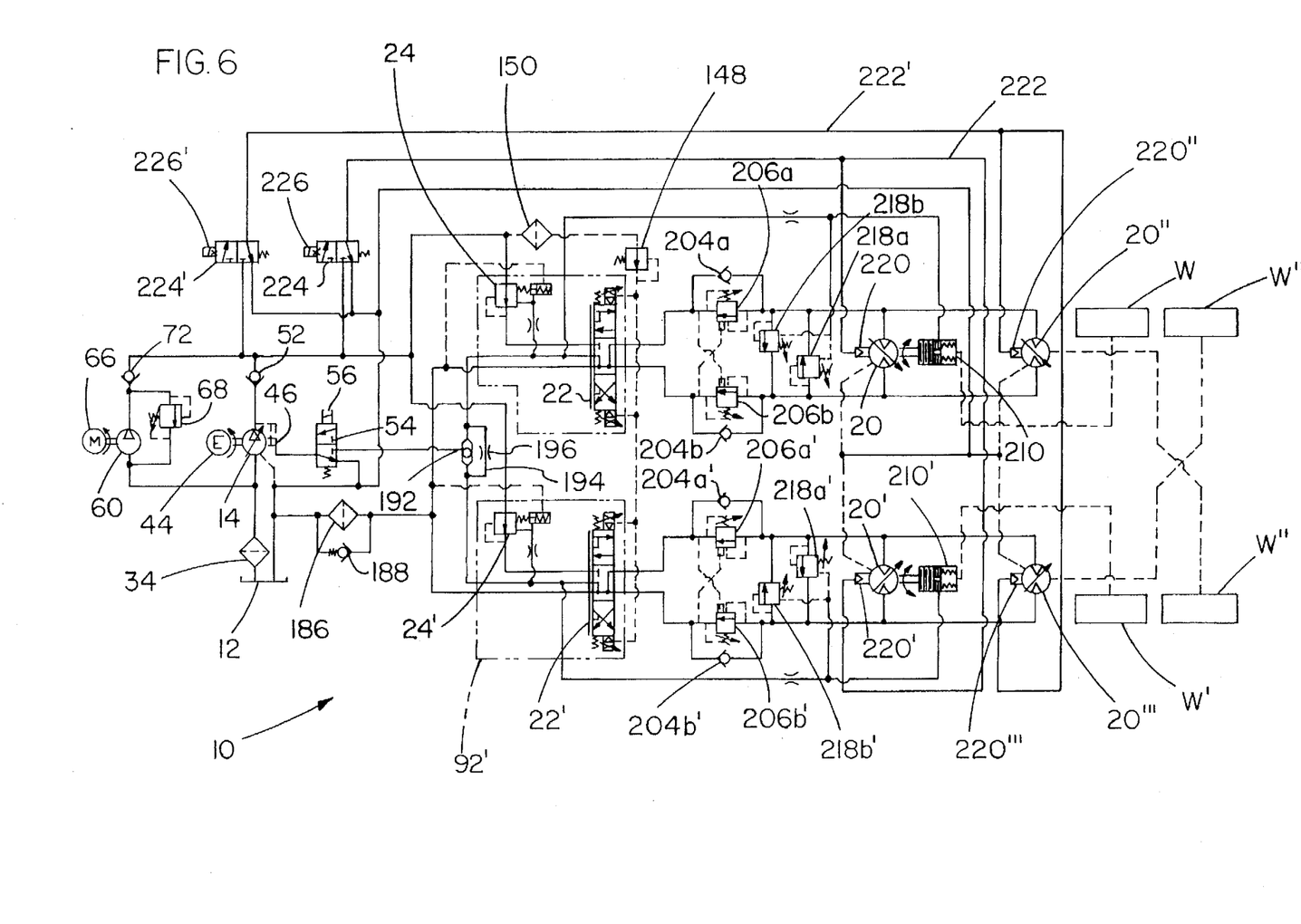
FIG. 6 is an schematic of a four wheel drive embodiment of the hydraulic drive system of the present invention.

FIG. 6 illustrates an hydraulic drive system similar to that of FIG. 1 except that it drives four vehicle wheels rather than two. The four-wheel drive system is identical in most respects to the two-wheel drive system described above except that two additional motors 20", 20'" are connected in parallel with the motors 20, 20'. As schematically illustrated, the motors 20, 20" driving the rear left and front right wheels W, W" are connected in parallel, and the motors 20', 20'" driving the front left and rear right wheels W', W'" are connected in parallel. In a turn where only the front wheels of the vehicle are steered, the outside front wheel turns the fastest and the inside rear wheel turns the slowest. Thus, by cross-matching the motors (i.e., connecting motor 20 with 20" and 20' with 20'"), the fastest turning and slowest turning motors are in the same circuit which minimizes the mismatch of fluid flow between the sub-circuits 16, 16'.

Similarly to the rearward motors 20, 20', the forward motors 20", 20'" are axial piston motors having two swash-plate angle settings. In contrast to the rearward motors 20, 20', the forward motors 20", 20'" have a low range setting and a freewheel (no displacement) setting in which the motors freewheel and do not drive the wheels. When in two-wheel drive, the rearward motors are positioned in either the high or low range settings and the forward motors are positioned in the freewheel setting. However, when in four-wheel drive, both the forward and rearward motors are positioned in the low range setting.

The forward motor swashplate angles are controlled by pressure delivered to motor controls 220", 220'" through a second control line 222'. A solenoid actuated, three-way, two-position valve 224' positioned in the second control line 222' switches the forward motors between the freewheel and low range settings. The valve 224' is movable between a first position in which the control line 222' is filled with fluid from the fluid distribution passage 80, causing the swashplate angle to be zero to permit the motor to freewheel, and a second position in which fluid in the control line 222' is drained to the source inlet passage 30, causing the swashplate to be angled to deliver high torque and low speed. The valve 224' is biased toward its second position and has a solenoid actuator 226' which must be energized to move the valve to its stated first position.

Although the vehicle chassis may be configured to have rigid or oscillatory axles, the preferred embodiment of the two-wheel drive system illustrated in FIG. 1 is manufactured with a rigid chassis to improve the vehicle stability. However, the four-wheel drive system illustrated in FIG. 6 is manufactured with oscillatory axles to provide improved traction.

Although many of the system characteristics (e.g., flow rates and pressures) have been assigned numerical values to enable a better understanding of the system operation, it should be understood that these values may vary without departing from the scope of the present invention. Further, although the disclosed relationships between the system characteristics are preferred, it should be understood that these relationships may also vary without departing from the scope of this invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An hydraulic drive system for driving a plurality of wheels of a vehicle, said drive system comprising:

an hydraulic fluid source for supplying hydraulic fluid to the system;

at least two motors in communication with the fluid source for driving the plurality of vehicle wheels in response to fluid supplied from the source, each of said motors driving at least one of said wheels at varying speeds in response to varying rates of fluid flow supplied to the motor from said fluid source;

a pump connected between the fluid source and said motors for drawing hydraulic fluid from the source and forcing the drawn fluid to said motors;

at least two flow restrictions, each of said flow restrictions being positioned between said pump and at least one of said motors, each restriction varying the rate of fluid flow to at least one of the motors in response to changes in fluid pressure upstream from said restriction; and at least two load-reaction compensators, each of said compensators being connected between said pump and at least one of said restrictions, each compensator controlling fluid pressure upstream from at least one of the restrictions to thereby control the speed of the respective wheel, each compensator maintaining a first generally constant fluid pressure upstream from the respective restriction when fluid pressure downstream from the compensator is below a first predetermined value, and each compensator maintaining a second generally constant fluid pressure upstream from the respective restriction when the downstream fluid pressure is above a second predetermined value.

2. The drive system as set forth in claim 1 wherein:

said first predetermined value is different from the second predetermined value;

said first generally constant fluid pressure is different from the second generally constant fluid pressure; and each of said compensators varies fluid pressure upstream from the respective flow restriction between the first generally constant fluid pressure and the second generally constant fluid pressure as fluid pressure downstream from the compensator varies between the first predetermined value and the second predetermined value.

3. The drive system as set forth in claim 2 wherein:

said first predetermined value is less than the second predetermined value;

said first generally constant fluid pressure is greater than the second generally constant fluid pressure; and each of said compensators linearly decreases fluid pressure upstream from the respective flow restriction from the first generally constant fluid pressure to the second generally constant fluid pressure as fluid pressure downstream from the compensator increases from the first predetermined value to the second predetermined value.

4. The drive system as set forth in claim 3 wherein the first generally constant fluid pressure is approximately twice the second generally constant fluid pressure.

5. The drive system as set forth in claim 4 wherein:

the system has a maximum operating pressure;

said first predetermined value is approximately one third of the system maximum operating pressure; and said second predetermined value is approximately two thirds of the system maximum operating pressure.

6. The drive system as set forth in claim 1 further comprising a balancing passage connecting said compensators, said passage having a restricting orifice for permitting fluid to pass between the compensators at a limited and predetermined rate to substantially equalize fluid pressures downstream from the compensators when such pressures differ by less than a predetermined amount.

7. The drive system as set forth in claim 1 further comprising a counterbalance valve positioned in series with at least one of said motors to inhibit fluid flow through the motor when fluid pressure upstream from the motor is below a predetermined level.

8. The drive system as set forth in claim 1 further comprising a brake adapted to inhibit at least one of said wheels from turning when fluid pressure downstream from the respective compensator is below a predetermined minimum value.

9. The drive system as set forth in claim 8 further comprising:

a by-pass line for by-passing the respective motor associated with the brake; and a valve positioned along the by-pass line for permitting fluid flow through the by-pass line when pressure downstream from the motor exceeds pressure downstream from the compensator by a predetermined amount.

10. The drive system as set forth in claim 1 further comprising at least two proportional direction control valves, each of said control valves being positioned between one of said compensators and at least one of said motors to control the direction in which fluid is supplied to the motor to thereby control the direction in which the respective wheel is driven, each of said control valves including one of said restrictions for controlling the rate of fluid flow to at least one of said motors.

11. An hydraulic drive system for driving a plurality of wheels of a vehicle, said drive system comprising:

an hydraulic fluid source for supplying hydraulic fluid to the system;

a pump in communication with the fluid source for drawing hydraulic fluid from the source and forcing the drawn fluid through the system; and at least two sub-circuits supplied with hydraulic fluid from the pump, each of said sub-circuits comprising:

a) at least one motor for driving one of the plurality of vehicle wheels in response to fluid supplied from the pump, said motor driving said wheel at varying speeds in response to varying rates of fluid flow supplied to said motor;

b) a flow restriction positioned between said pump and said motor, said restriction varying the rate of fluid flow to said motor in response to changes in fluid pressure upstream from the restriction; and c) a load-reaction compensator connected between the pump and said restriction, said compensator controlling fluid pressure upstream from said restriction to thereby control the speed of the respective wheel, the compensator maintaining a first generally constant fluid pressure upstream from said restriction when fluid pressure downstream from the compensator is below a first predetermined value, and the compensator maintaining a second generally constant fluid pressure upstream from said restriction when the downstream fluid pressure is above a second predetermined value.

12. The drive system as set forth in claim 11 wherein:

the pump is adapted to sense a reference pressure at a reference port and to force hydraulic fluid through the system at a pump output pressure greater than the reference pressure by a generally constant amount;

fluid pressures downstream from the compensators include a larger pressure in one of said sub-circuits and a smaller pressure in the other of said sub-circuits; and the system further comprises a shuttle valve in communication with the reference port of the pump, the shuttle valve being operable to inhibit fluid at said smaller pressure from passing through the valve, and to permit fluid at said larger pressure to pass through the valve and be delivered to the reference port of the pump as the reference pressure.

13. The drive system as set forth in claim 11 wherein each of said sub-circuits comprises two motors for driving two wheels of the plurality of vehicle wheels in response to fluid supplied from the source.

14. The drive system as set forth in claim 13 wherein:
   one of the two motors of a first sub-circuit of said two sub-circuits drives a front left wheel of the plurality of vehicle wheels and the other motor of the first sub-circuit drives a rear right wheel of the plurality of vehicle wheels; and
   one of the two motors of a second sub-circuit of said two sub-circuits drives a front right wheel of the plurality of vehicle wheels and the other motor of the second sub-circuit drives a rear left wheel of the plurality of vehicle wheels.

15. A drive system for driving four wheels of a vehicle, said wheels comprising a front left wheel, a front right wheel, a rear left wheel, and a rear right wheel, said drive system comprising:
   a fluid source for supplying a fluid to the system;
   four motors connected to the fluid source for driving the vehicle wheels in response to fluid supplied from the source, each of said motors driving one of said wheels at varying speeds in response to varying rates of fluid flow supplied to the motor from said fluid source;
   a pump for drawing fluid from the fluid source and forcing drawn fluid to said motors;
   at least two flow restrictions, each of said flow restrictions being positioned between said pump and at least one of said motors, each restriction varying the rate of fluid flow to at least one of said motors in response to changes in fluid pressure upstream from said restriction; and
   at least two compensators, each of said compensators being connected between said pump and at least one of said restrictions, each compensator controlling fluid pressure upstream from at least one of the restrictions to thereby control the speed of the respective wheel, each compensator maintaining a first generally constant fluid pressure upstream from the respective restriction when fluid pressure downstream from the compensator is below a first predetermined value, each compensator maintaining a second generally constant fluid pressure upstream from the respective restriction when the downstream fluid pressure is above a second predetermined value, and each compensator varying fluid pressure upstream from the respective restriction between the first and second generally constant pressures when the downstream fluid pressure is between the first and second predetermined values.

16. The drive system as set forth in claim 15 wherein one of said compensators controls the speed of the front right and rear left wheels and another of said compensators controls the speed of the front left and rear right wheels.

17. The drive system as set forth in claim 15 further comprising at least one brake adapted to inhibit one of said wheels from turning when fluid pressure downstream from the respective compensator is below a predetermined minimum value.

18. The drive system as set forth in claim 17 further comprising:
   a by-pass line for by-passing the respective motor associated with the brake; and
   a valve positioned along the by-pass line for permitting fluid flow through the by-pass line when pressure downstream from the motor exceeds pressure downstream from the compensator by a predetermined amount.

19. The drive system as set forth in claim 15 further comprising a counterbalance valve positioned in series with at least one of said motors to inhibit fluid flow through the motor when fluid pressure upstream from said motor is below a predetermined level.

20. The drive system as set forth in claim 15 further comprising at least two proportional direction control valves, each of said control valves being positioned between one of said compensators and at least one of said motors to control the direction in which fluid is supplied to the motor to thereby control the direction in which the respective wheel is driven, each of said control valves including one of said restrictions for controlling the rate of fluid flow to at least one of said motors.

21. An aerial work platform having an hydraulic drive system for driving a plurality of wheels of the work platform, said drive system comprising:
   an hydraulic fluid source for supplying hydraulic fluid to the system;
   at least two motors in communication with the fluid source for driving the plurality of work platform wheels in response to fluid supplied from the source, each of said motors driving at least one of said wheels at varying speeds in response to varying rates of fluid flow supplied to the motor from said fluid source;
   a pump connected between the fluid source and said motors for drawing hydraulic fluid from the source and forcing the drawn fluid to said motors;
   at least two flow restrictions, each of said flow restrictions being positioned between said pump and at least one of said motors, each restriction varying the rate of fluid flow to at least one of the motors in response to changes in fluid pressure upstream from said restriction; and
   at least two load-reaction compensators, each of said compensators being connected between said pump and at least one of said restrictions, each compensator controlling fluid pressure upstream from at least one of the restrictions to thereby control the speed of the respective wheel, each compensator maintaining a first generally constant fluid pressure upstream from the respective restriction when fluid pressure downstream from the compensator is below a first predetermined value, and each compensator maintaining a second generally constant fluid pressure upstream from the respective restriction when the downstream fluid pressure is above a second predetermined value.

22. An aerial work platform having an hydraulic drive system for driving a plurality of wheels of the work platform, said drive system comprising:
   an hydraulic fluid source for supplying hydraulic fluid to the system;
   a pump in communication with the fluid source for drawing hydraulic fluid from the source and forcing the drawn fluid through the system; and at least two sub-circuits supplied with hydraulic fluid from the pump, each of said sub-circuits comprising:
a) at least one motor for driving one of the plurality of work platform wheels in response to fluid supplied from the pump, said motor driving said wheel at varying speeds in response to varying rates of fluid flow supplied to said motor;
b) a flow restriction positioned between said pump and said motor, said restriction varying the rate of fluid flow to said motor in response to changes in fluid pressure upstream from the restriction; and
c) a load-reaction compensator connected between the pump and said restriction, said compensator controlling fluid pressure upstream from said restriction to thereby control the speed of the respective wheel, the compensator maintaining a first generally constant fluid pressure upstream from said restriction when fluid pressure downstream from the compensator is below a first predetermined value, and the compensator maintaining a second generally constant fluid pressure upstream from said restriction when the downstream fluid pressure is above a second predetermined value.

* * * * *